June 10, 1947.　　　　　D. S. BOND　　　　　2,422,073
RADIO DIRECTION FINDER
Filed July 30, 1942　　　2 Sheets-Sheet 1
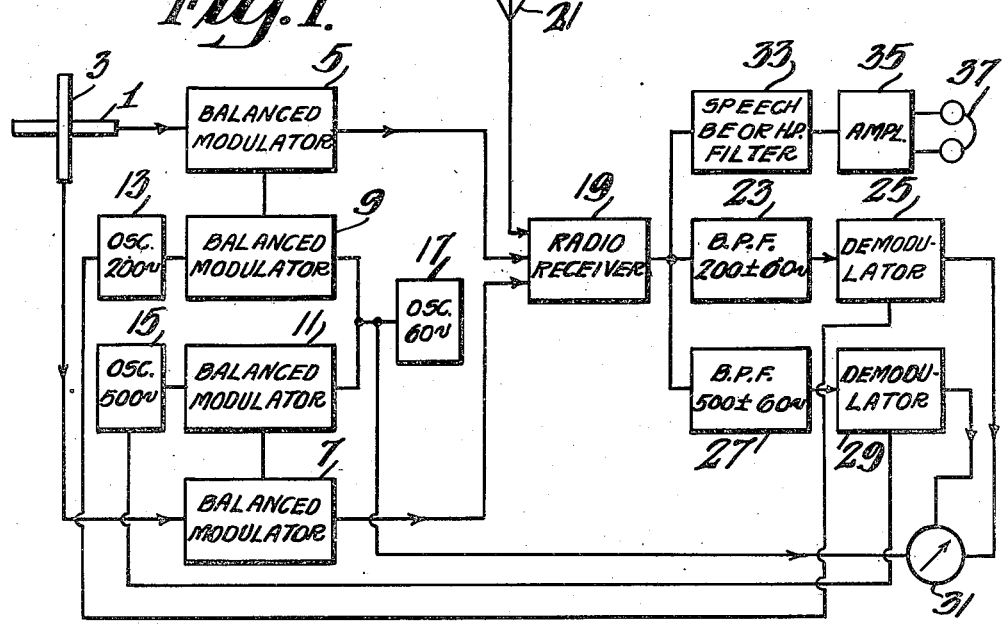
Inventor
Donald S. Bond
By
C D Tuska
Attorney

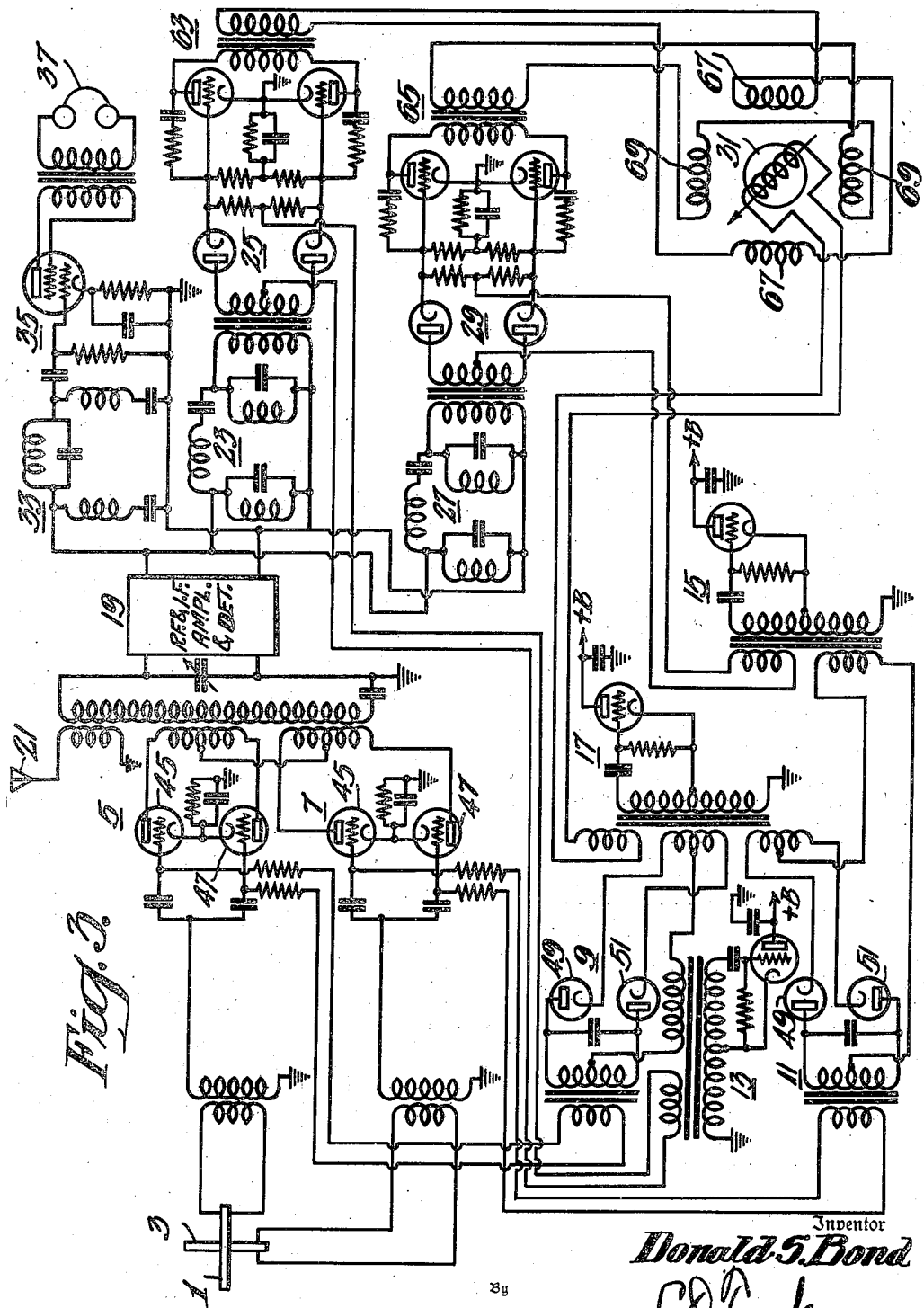

Patented June 10, 1947

2,422,073

UNITED STATES PATENT OFFICE 2,422,073

RADIO DIRECTION FINDER

Donald S. Bond, Philadelphia, Pa., assignor to Radio Corporation of America, a corporation of Delaware Application July 30, 1942, Serial No. 452,825

5 Claims. (Cl. 250—11)

This invention relates to radio direction finders of the stationary antenna, direct indicating type. Two similar directive antennas or arrays are positioned with their directivity patterns at right angles to each other. The two antenna outputs are amplified, detected, and applied to rectangularly disposed deflecting elements in a bearing indicator, which operates continuously to show the instantaneous azimuth of arrival of waves to which the apparatus is tuned.

Although it is possible to use separate receivers for each of the two antennas, such an arrangement requires identical gains through the two channels in order to give accurate bearing indications. The equality of gain required is far beyond the capacity of conventional automatic gain control systems.

In order to avoid errors due to different treatment of the signals from the two antennas, it is desirable to combine the signals before amplification, employ a common amplifier, and then separate the components corresponding to the original signals. According to the present invention, the antenna outputs are differently modulated, amplified and detected together, and the products separated by means responsive to the respective modulations.

The principal object of this invention is to provide an improved fixed antenna direct indicating direction finder system.

Another object is to provide an improved method of and means for amplifying the individual antenna signals in a system of the described type.

A further object is to provide an improved method of and means for deriving two voltages of the same low frequency, with amplitudes proportional to the respective signals picked up by each of a pair of antennas.

Other and incidental objects of the invention will become apparent to those skilled in the art upon consideration of the following description, with reference to the accompanying drawing, of which Fig. 1 is a schematic block diagram of an embodiment of the invention, Figs. 2a—2f are diagrams of the frequency spectra at various points in the system, and Fig. 3 is a circuit diagram corresponding to the block diagram of Fig. 1.

Referring to Fig. 1, a pair of directive antennas such as loops 1 and 3 are positioned at right angles to each other and connected to the signal inputs of balanced modulators 5 and 7 respectively. The control inputs of the modulators 5 and 7 are connected to the output circuits of balanced modulators 9 and 11, respectively, which are in turn connected to low frequency oscillators 13 and 15 respectively and to a common control oscillator 17. The outputs of the modulators 5 and 7 are connected to a radio receiver 19. A non-directive antenna 21 is also connected to the input circuit of the receiver 19. The output circuit of the receiver is connected through a band pass filter 23 to a demodulator 25, and through a band pass filter 27 to a demodulator 29 to permit monitoring of the signals picked up by the direction finder, transducing means such as a pair of head phones 37 or the like is connected through an audio amplifier 35 and a filter 33 to the output circuit of the receiver 19. The filter 33 is arranged to remove the modulation components introduced by the oscillators 13, 15 and 17. The outputs of the demodulators 25 and 29 are connected to orthogonally related field coils of a self-synchronous type indicating instrument 31. The rotor coil of the device 31 is connected to the oscillator 17.

The operation of the system is as follows: The oscillators 13, 15 and 17 are arranged to provide audio frequencies which are readily separable from speech components, such as 200, 500, and 60 cycles per second respectively. The modulator 9 will then provide a carrier suppressed double sideband signal (Fig. 2b) comprising the 140 and 260 cycle sidebands of a 200 cycle carrier modulated at 60 cycles. This controls the modulator 5 to produce the sidebands only of a radio frequency input modulated at 140 and 260 cycles (Fig. 2c). For example, if the input signal is 1000 kilocycles, the output of the modulator 5 comprises the lower sidebands at 999,740 cycles and 999,860 cycles, and the upper sidebands of 1,000,140 and 1,000,260 cycles, as shown in Fig. 2c. These sidebands are combined at the input of the receiver 19 with the 1000 kilocycle carrier picked up by the antenna 21 (Fig. 2d) and produce at the receiver output (Fig. 2e) the 60 cycle sidebands of a 200 cycle carrier at 140 and 260 cycles. The sideband amplitude is proportional to the amplitude of the original 1000 kilocycle signal picked up by the loop 1. The 200 cycle carrier is resupplied at the demodulator 25, which derives from the combined signals a 60-cycle voltage (Fig. 2f) likewise proportional in amplitude to the 1000 kilocycle signal.

In the same manner, a 500 cycle carrier with 60 cycle sidebands is derived from the loop 3, modulators 7 and 11, and oscillators 15 and 17. The 200 and 500 cycle signals are separated by band pass filters 23 and 27 before demodulation at demodulators 25 and 29 respectively. The field coils of the meter 31 are thus supplied with 60 cycle voltages proportional in amplitude to the 1000 kilocycle voltages derived from the loops 1 and 3. The rotor of the meter is supplied with 60 cycle voltage from the oscillator 17, and rotates to align with the resultant field of the stator windings, corresponding in direction to the azimuth of arrival of the 1000 kilocycle wave at the antennas.

Referring to Fig. 3, the reference numerals are the same as those used for corresponding parts in Fig. 1. The loops 1 and 3 are connected to balanced modulators 5 and 7 respectively. The modulators 5 and 7 each comprise a pair of tubes 45 and 47 with push pull output circuit connections. The radio frequency input is fed to the two control grids in phase, while the low frequency control input is fed to the two grids in push pull.

The modulators 9 and 11 are shown as bridge rectifier circuits, with symmetrical input and output and opposed diodes 49 and 51. The control voltage is brought in between the centers of the input and output circuits. Copper oxide or similar rectifiers may be substituted for the diodes 49 and 51.

The oscillators 13, 15 and 17 are illustrated as circuits of the Hartley type, although any preferred circuit may be used. The amplitudes of the sub-carriers generated by the oscillators 13 and 15 are preferably made large in comparison with the output of the oscillator 17 to make the side band outputs nearly independent of variations in the sub-carrier amplitudes. Similarly the outputs from the modulators 9 and 11 into the modulators 5 and 7 are made large in comparison with the radio frequency inputs, so that the outputs of the modulators 5 and 7 will respond only to variations in the smaller of the two inputs.

The receiver 19 is of conventional design, and includes, for example, a radio frequency amplifier, oscillator, mixer, intermediate frequency amplifier, and a detector, which are not shown. The filters 23, 27 and 33 are also conventional. The demodulators 25 and 29 are illustrated as bridge circuits similar to modulators 9 and 11, with control voltages derived from the oscillators 13 and 15 respectively. Audio amplifiers 63 and 65, stabilized by negative feedback, are provided between the outputs of the demodulators 25 and 29 and the respective coils 67 and 69 of the indicator 31.

Thus the invention has been described as a direct indicating direction finder. The outputs of a pair of crossed directive antennas are differently modulated, combined and amplified together, separated according to the different modulations, and demodulated to provide two voltages of the same low frequency and proportional in amplitude to the respective antenna outputs. These two voltages are used to operate a bearing indicator.

I claim as my invention:

1. A radio direction finder comprising orthogonally related directive antennas, three local oscillators, modulator means arranged to combine the outputs of one pair of said oscillators, modulator means arranged to modulate the output of one of said antennas with the combined output of said pair of oscillators, a second modulator means arranged to modulate the output of the other of said antennas with the combined outputs of another pair of said oscillators, a non-directive antenna, means for combining the modulated outputs of said directive antennas with the output of said non-directive antenna, a radio receiver connected to respond to the last mentioned combined outputs, filter means arranged to separate the different modulation components in the output of said receiver, demodulators connected to convert said modulation components to alternating voltages having amplitudes proportional respectively to the amplitudes of the outputs of said directive antennas and a frequency equal to that of one of said local oscillators, and indicator means responsive to said alternating voltages and to the output of said last mentioned local oscillator.

2. A radio direction finder including two directive antennas arranged with their directivity patterns at right angles, means for doubly modulating the outputs of both of said antennas with one frequency common to both outputs and at other frequencies different for each output, means for combining said modulated outputs, a radio receiver connected to amplify and detect said modulated and combined outputs, filter means for separating the components of the output of said receiver, demodulators arranged to convert each of said components into an alternating voltage of a frequency corresponding to said common modulating frequency, and indicator means responsive to said alternating voltages.

3. In a direct indicating radio direction finder employing stationary directive antennas, three local oscillators, means for modulating the outputs of each of two of said oscillators with the output of the third, means for modulating the output of each of said antennas with the modulated output of one of said two oscillators, means for combining said modulated outputs from said antenna, a radio receiver arranged to respond to said modulated and combined antenna outputs, filters connected to separate the components of the output of said receiver, and demodulators responsive to each of said components and to the output of one of said two oscillators respectively to produce voltages of equal frequencies and of magnitudes proportional respectively to the outputs of said antennas.

4. The system as claimed in claim 2, including in addition a non-directive antenna and means for combining the output of said non-directive antenna with the doubly modulated outputs of the directive antennas.

5. In a radio direction finder employing stationary directive antennas and a non-directive antenna, three local oscillators, means for modulating the outputs of each of two of said oscillators with the output of the third, means for modulating the output of each of said directive antennas with the modulated output of one of said two oscillators, means for combining said modulated outputs from said directive antennas with the output of said non-directive antenna, a radio receiver arranged to respond to said modulated and combined antenna outputs, filters connected to separate the components of the output of said receiver, and demodulators responsive to each of said components and to the output of one of said two oscillators respectively to produce voltages of equal frequencies and of magnitudes proportional respectively to the outputs of said directive antennas.

DONALD S. BOND.

REFERENCES CITED

The following references are of record in the file of this patent:

UNITED STATES PATENTS

| Number | Name | Date |
|---|---|---|
| 2,213,874 | Wagstaffe | Sept. 3, 1940 |
| 2,213,273 | Earp | Sept. 3, 1940 |